May 8, 1956  P. J. SFERRAZZA  2,745,060
MICROWAVE RADIO FREQUENCY CONVERTER SYSTEMS
Filed Sept. 2, 1954

INVENTOR
PETER J. SFERRAZZA
BY
ATTORNEY

United States Patent Office 2,745,060
Patented May 8, 1956

2,745,060

MICROWAVE RADIO FREQUENCY CONVERTER SYSTEMS

Peter J. Sferrazza, Wantagh, N. Y., assignor to Sperry Rand Corporation, a corporation of Delaware Application September 2, 1954, Serial No. 453,866

6 Claims. (Cl. 324—58)

This invention relates to improvements in microwave radio frequency converter systems, and more particularly to systems wherein the high-frequency signal that is to be converted to a lower intermediate frequency is mixed with a locally generated signal of said lower frequency to produce a beating signal whose frequency differs from that of the high frequency signal by an amount equal to the intermediate frequency. The beating signal is then mixed with the high frequency signal to produce an intermediate frequency signal having the modulation characteristics of the original high frequency signal. In radio receivers and similar devices requiring detection of high frequency signals, some form of heterodyne detection is generally preferable to detection by simple rectification of the high frequency signal because it affords much higher sensitivity than the latter. Systems of the type described herein have the advantage of enabling heterodyne detection of high frequency signals, without requiring a local high frequency oscillator which must be "tracked," or adjusted to maintain a constant relatively low frequency difference with respect to the high frequency signal that is to be detected.

According to the present invention, a relatively simple wave guide network and a pair of crystal mixers are arranged to derive a beating frequency signal from a locally generated intermediate frequency source and the carrier signal which is to be detected. The system of the present invention is particularly adaptable to microwave radio receivers as used for testing and measuring purposes, but its use is not limited thereto.

The principal object of the present invention is to provide a frequency converter system of the above-mentioned type which is simple in construction and dependable in operation, requiring no special parts or critical adjustments.

Another object of the invention is to provide an improved system for modulating a high frequency carrier and separating the side bands resulting from such modulation.

A further object of the invention is to provide improved methods of and means for measuring the characteristics of microwave radio devices and circuits.

Figure 1:
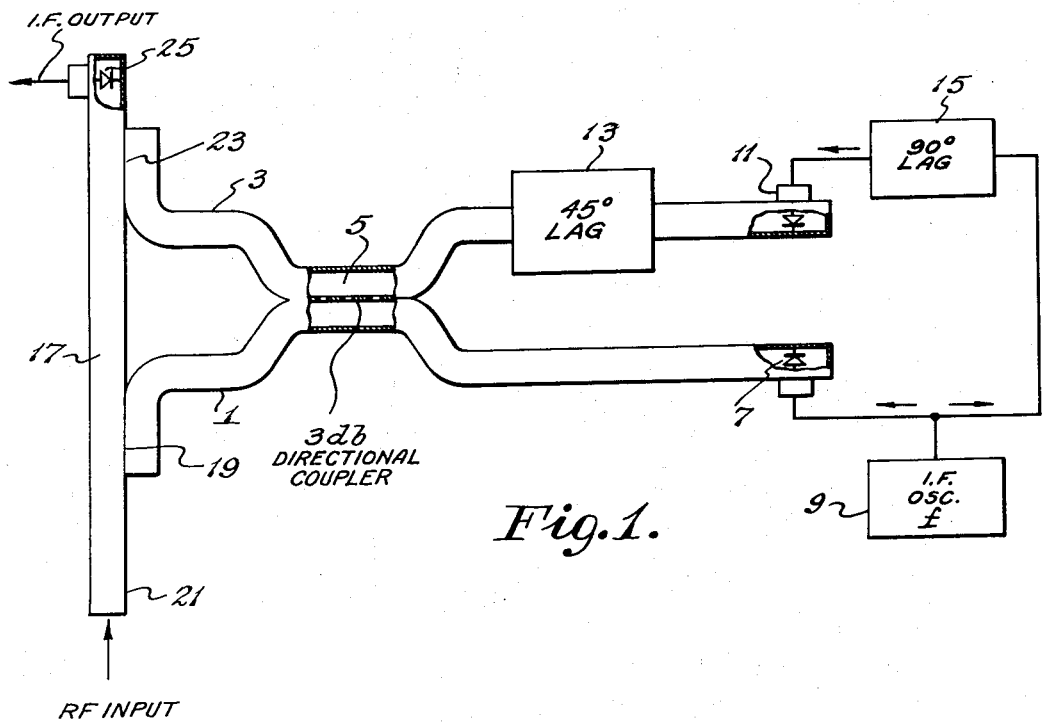
Figure 2:
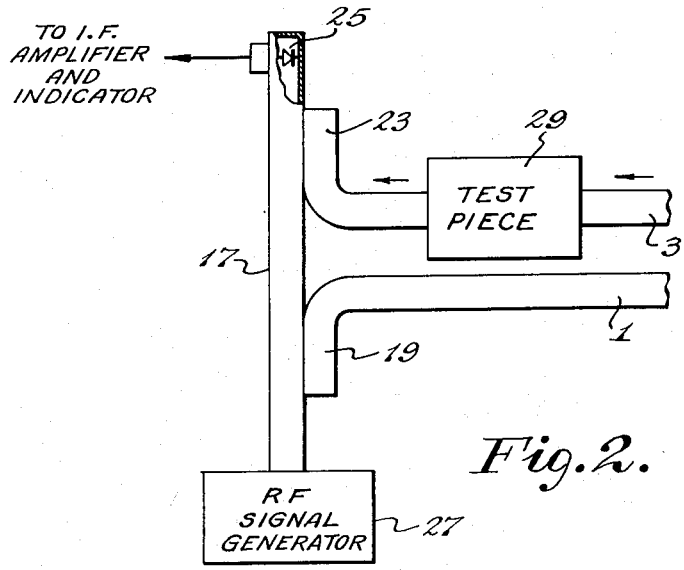

The invention will be described with reference to the accompanying drawing, wherein Fig. 1 is a schematic diagram of a frequency converter system embodying the invention, and Fig. 2 is a schematic diagram showing the connection of a microwave device which is to be tested in one of the branches of the circuit of Fig. 1.

The system of Fig. 1 includes a pair of wave guides 1 and 3 which are joined together at a region intermediate their respective ends by a directional coupler 5. The coupler 5 is designed in known manner to provide an attenuation of 3 db in coupling from each of the wave guides to the other and to provide a directivity of, say 20 db or more. The wave guide 1 goes on from the directional coupler 5 to a mixer device 7 which may consist of a non-linear impedance device, preferably a crystal, lying in the E plane of the wave guide and connected to an intermediate frequency source 9.

The other wave guide 3 is similarly connected to a mixer device 11 but includes, in addition, a phase shifter 13 between the directional coupler 5 and the mixer 11. The phase shifter 13 is designed or adjusted to provide a phase shift of substantially 45 degrees at the frequency F of the microwave carrier with which the system is to operate. The intermediate frequency source 9 is also connected to the mixer 11 through a phase shifter 15, which is designed or adjusted to provide a 90° phase shift at the intermediate frequency $f$.

A further wave guide 17 is coupled to the wave guide 1 through a directional coupler 19 in such manner that high frequency energy which is applied to the input end 21 of the wave guide 17 will be transferred in part to the wave guide 1, the remainder of the input energy continuing along the wave guide 17. The wave guide 3 is coupled to the wave guide 17 by means of the directional coupler 23, in such manner that high frequency energy travelling from right to left in the guide 3 will be transferred to the guide 17 and travel therein in the same direction as the input signal entering the end 21. A mixer 25, similar to the mixers 7 and 11, is provided in the wave guide 17 beyond the directional coupler 23, so as to receive both the original input signal and a beating frequency signal from the wave guide 3.

In the operation of the system of Fig. 1, the input signal of frequency F entering the wave guide 1 through the directional coupler 19 goes to the 3 db coupler 5, where it is divided, half of the power being transferred to the wave guide 3 and the other half continuing along the wave guide 1. The latter portion of the input signal goes to the mixer 7, where it is combined with the intermediate frequency signal from the source 9 to produce modulation product signals of frequencies $F+f$ and $F-f$ respectively.

Directional couplers in general have the characteristic of introducing a relative phase shift of exactly 90° between the part of a signal that is transferred from one of the wave guides to the other and the part that continues along the same wave guide as before. Thus, the portion of the original input signal that reaches the guide 3 is in phase quadrature with respect to the corresponding signal in the guide 1. The phase shifter 13 adds a further phase delay of 45°, so the carrier frequency signal at the mixer 11 is 135° behind that at the mixer 7. Owing to the phase shifter 15, the intermediate frequency signal at the mixer 11 lags that at the mixer 7 by 90°. Accordingly, the upper side band $(F+f)$ produced at the mixer 11 will lag the corresponding side band produced at the mixer 7 by an angle of 135° plus 90°, or 225°. The lower side band $(F-f)$ at the mixer 11 will lag that at the mixer 7 by an angle of 135° minus 90°, or 45°.

The side band signals generated at the mixers 7 and 11 are reflected in the respective guides toward the directional coupler 5. The phase shifter 13 again adds a 45° lag to the signals in the guide 3, thus making the upper side band in the guide 3 lag that in the guide 1 by a total of 270°. Similarly, the lower side band in the guide 3 will lag that in the guide 1 by 90°.

The directional coupler 5 splits each of the returning signals into two equal parts, one part continuing along the respective guide in which it originated, and the other part being transferred to the other wave guide, undergoing an additional 90° phase shift in the process of being transferred. As a result of this additional phase shift, the upper side band component which is transferred from the guide 1 to the guide 3 is now 180° out of phase with the upper side band component returning from the mixer 11, thus causing substantial cancellation of these components in the wave guide 3. On the other hand, the lower side band component in the wave guide 1, which leads that in the wave guide 3 by 90° before entering the directional coupler 5, is delayed in the coupler by 90°, and thus reaches the wave guide 3 in phase with the lower side band component derived from the mixer 11.

Thus, assuming that the wave guides 1 and 3 are of equal lengths, and the mixers 7 and 11 have substantially identical characteristics, the upper side band $(F+f)$ will be substantially cancelled in the wave guide 3, while the lower side band $(F-f)$ will be reinforced. By similar reasoning it will be seen that the lower side band will be cancelled in the wave guide 1 and the upper side band will be reinforced.

In the system of Fig. 1, the lower side band $(F-f)$ is used as the beating signal. This signal is transferred through the directional coupler 23 to the wave guide 17, where it travels to the mixer 25. Here the original input signal (carrier frequency F) combines with the beating signal $(F-f)$ to produce a modulation product of frequency $f$. This intermediate frequency signal will carry whatever modulation is present on the original input signal, and it may be amplified and detected by conventional I. F. amplifier and detector means, not shown.

From the foregoing description, it will be apparent that the I. F. carrier frequency in the output of the system of Fig. 1 is independent of the frequency of the R. F. carrier frequency in the input, and depends only upon the frequency of the I. F. source 9. The source 9, being a relatively low frequency device, can readily be stabilized to maintain a frequency sufficiently constant to keep the I. F. output signal within the pass band of a highly selective I. F. amplifier. Furthermore the frequency of the R. F. input may be allowed to vary throughout a substantial band without requiring any tuning or other adjustment of the system.

The non-tuning feature of the present system is particularly useful in receivers used for laboratory measurements of the characteristics of microwave devices and circuits wherein the frequency of the microwave signal cannot be stabilized, or where the frequency is to be varied over a band. One way of making such measurements would be to connect the device to be tested between an R. F. signal source and the input end 21 of the wave guide 17. With such an arrangement, however, the amplitude of the beating signal that reaches the mixer 25 will vary in the same manner as that of the microwave signal reaching the mixer 25 directly through the wave guide 17.

It would ordinarily be preferable to have one of the two signals reaching the mixer 25 to remain at a constant amplitude, said amplitude being substantially greater than that of the other signal. This relationship can be obtained by the arrangement shown in Fig. 2, wherein the microwave signal generator 27 is connected directly to the wave guide 17, and the apparatus 29 which is to be tested is connected in the wave guide 3 between the directional coupler 5 and the coupler 23. In this case, the frequency at which the device 29 is tested will be one of the side bands $(F+f)$ or $(F-f)$. The attenuation in directional coupler 5, wave guides 1 and 3, mixers 7 and 11, and any attenuation in the tested device 29, will reduce the amplitude of the beating signal to a value substantially below that of the R. F. signal arriving at the mixer 25 through the wave guide 17. Also the amplitude of the latter signal will depend only upon the output of the generator 27 and will be independent of any variation in the attenuation of the apparatus 29 under test.

Although a specific embodiment of the invention has been described, arranged to utilize the lower side band $F-f$, it will be apparent that the upper side band $F+f$ may be produced in the wave guide 3 by adjusting the phase shifter 15 to provide a 90° lead, or 270° lag, instead of a 90° lag. In addition to its use for laboratory purposes, the described frequency converter system may find applications generally in the field of microwave radio, as in receivers, single side band transmission systems, and other systems requiring side band separation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A frequency converter for microwave radio systems, comprising first and second wave guides having a common wall portion provided with a directional coupling array designed to introduce an attenuation of substantially 3 decibels in the coupling between said wave guides, a first mixer device connected to one end of the first of said wave guides, a second mixer device connected to the corresponding end of the second of said wave guides, means in one of said wave guides between said directional coupler array and the respective mixer for introducing a phase shift of substantially 45 degrees at the frequency of the microwave carrier which is to be converted, means for applying an intermediate frequency signal in quadrature phase relationship to said first and second mixers, a third wave guide, means for applying the microwave carrier signal to be converted to one end of said third wave guide, a directional coupler coupling said third wave guide to said first wave guide to transfer a portion of said microwave signal to said first wave guide, a further directional coupler coupling said second wave guide to said third wave guide to transfer a microwave beating signal from said second wave guide to said third wave guide, and a third mixer device connected to said third wave guide to receive said microwave carrier signal and said microwave beating signal and thereby produce an output signal of intermediate frequency.

2. Apparatus for modulating a microwave signal of frequency F with a signal of substantially lower frequency $f$ and delivering the side band signals of frequencies $F+f$ and $F-f$ respectively to separate output points, comprising first and second wave guides, means directionally coupling a region intermediate the ends of said first wave guide with the corresponding region of said second wave guide, a first mixer connected to one end of said first wave guide, a second mixer connected to the corresponding end of said second wave guide, means in one of said wave guides between said directional coupling means and the respective mixer for introducing a phase shift of substantially 45 degrees at said frequency F, and means for applying said signal of frequency $f$ to said first and second mixers in quadrature phase relationship, thereby reflecting sideband signal components of frequency $F+f$ and frequency $F-f$ in both of said wave guides, the phase relationship of said reflected signals after traversal of said coupled region being such as to cause cancellation of one of said reflected signals in the first of said wave guides and cancellation of the other of said reflected signals in the second of said wave guides.

3. Apparatus for testing a radio device, comprising means for producing a first signal of relatively high frequency F and means for producing second and third signals of relatively low frequency $f$, said second and third signals being in phase quadrature, means for mixing said first signal with said second signal to produce a first pair of side band signals of frequencies $F+f$ and $F-f$ respectively, means for mixing said first signal with said third signal to produce a second pair of side band signals of frequencies $F+f$ and $F-f$ respectively, means for combining said first and second pairs of side band signals to produce cancellation of said side band signals at one of said side band frequencies and addition at the other of said side band frequencies to produce a resultant side band signal, means for applying said resultant side band signal as input to the device to be tested, and means for mixing the resultant output of said device with said first mentioned signal to produce a signal of said frequency $f$ representing the characteristics of said device at said frequency of said resultant side band signal.

4. Apparatus for modulating a microwave signal of frequency F with a signal of substantially lower frequency $f$ and delivering the side band signals of frequencies $F+f$ and $F-f$ respectively to separate output points, comprising first and second wave guides, means directionally coupling a region intermediate the ends of said first wave guide with the corresponding region of said second wave guide, said coupling means providing a coupling of substantially three decibels and introducing a phase delay of 90° in signals that it transfers from either wave guide to the other, a first mixer connected to one end of said first wave guide, a second mixer connected to the corresponding end of said second wave guide, means in one of said wave guides between said directional coupling means and the respective mixer for introducing a phase shift of substantially 45° at said frequency F, and means for applying said signal of frequency $f$ to said first and second mixers in quadrature phase relationship, thereby reflecting side band signal components of frequency $F+f$ and frequency $F-f$ in both of said wave guides, one of said reflected signals in said first wave guide leading the corresponding signal in said second wave guide by 90° and the other of said reflected signals in said first wave guide lagging the corresponding signal in said second wave guide by 90°, the 90° phase delay of said directional coupling means producing an out-of-phase relationship between the reflected signal of said frequency $F+f$ and an in-phase relationship between the reflected signals of said frequency $F-f$ in one of said wave guides, and an out-of-phase relationship between the reflected signals of said frequency $F-f$ and an in-phase relationship between the reflected signals of said frequency $F+f$ in the other of said wave guides.

5. Apparatus for producing a beating frequency signal that differs in frequency from a microwave input signal by an intermediate frequency, comprising first and second mixer devices, a source of signal of said intermediate frequency, means for applying said intermediate frequency signal to said mixer devices in quadrature phase relationship, a directional coupler including two wave guides having a common wall portion and coupling means in said common wall designed to provide substantially 3 decibels attenuation in the coupling between said wave guides, means connecting a first end of one of said wave guides to said first mixer device, means connecting the corresponding first end of the other of said wave guides to said second mixer device, one of said last two mentioned connecting means including means providing a substantially 45 degree phase shift at the frequency of said microwave input signal, means for applying said input signal to the second end of one of said wave guides, and means for withdrawing the beating frequency signal from the corresponding second end of the other of said wave guides.

6. Apparatus for producing a beating frequency signal that differs in frequency from a microwave input signal by an intermediate frequency, comprising first and second mixer devices, a source of signal of said intermediate frequency, means for applying said intermediate frequency signal to said mixer devices in quadrature phase relationship, two wave guides having a common wall portion and directional coupling means in said common wall, means connecting corresponding first ends of said wave guides to said first and second mixer devices respectively, means in one of said guides providing a substantially 45 degree phase shift at the frequency of said microwave input signal, means for applying said input signal to the second end of one of said wave guides, and means for withdrawing the beating frequency signal from the corresponding second end of the other of said wave guides.

References Cited in the file of this patent

UNITED STATES PATENTS 2,622,127     Alsberg et al.            Dec. 16, 1952